(12) United States Patent
Oh

(10) Patent No.: US 6,286,774 B1
(45) Date of Patent: Sep. 11, 2001

(54) FISHING REEL HAVING NUT LOCK FOR PREVENTING LOOSENESS OF NUT

(75) Inventor: Chul Suk Oh, #1-31 Byeksan Village, Cheongwun-Dang, Chongno-Gu, Seoul (KR)

(73) Assignee: Chul Suk Oh, Seoul (KR)

( * ) Notice: Subject to any disclaimer, the term of this patent is extended or adjusted under 35 U.S.C. 154(b) by 0 days.

(21) Appl. No.: 09/556,602

(22) Filed: Apr. 21, 2000

(30) Foreign Application Priority Data

Apr. 27, 1999 (KR) .................................................. 99-6943

(51) Int. Cl.⁷ ..................................................... A01K 89/00
(52) U.S. Cl. ........................... 242/283; 411/120; 411/374
(58) Field of Search ............................... 44/119, 120, 121, 44/195, 196, 197, 372.5–374, 429, 431; 242/283

(56) References Cited

U.S. PATENT DOCUMENTS

| | | | |
|---|---|---|---|
| 369,242 | * | 8/1887 | Higgin . |
| 1,261,002 | * | 4/1918 | Baas . |
| 2,407,928 | * | 9/1946 | Hereshoff . |
| 5,690,290 | * | 11/1997 | Asano . |
| 5,827,029 | * | 10/1998 | Denman . |
| 5,906,323 | * | 5/1999 | Morimoto . |

* cited by examiner

Primary Examiner—Flemming Saether
(74) Attorney, Agent, or Firm—Welsh & Katz, Ltd.

(57) ABSTRACT

A handle fixing structure including a nut member which is received inside of a recess of a handle and couples the handle with a driving shaft, a nut lock member aligned inside of the recess by being in close contact with the nut member for prevention of looseness thereof the nut member, and a cover for shielding the recess and limiting movement of the cut lock member through contact therewith during shielding. The nut lock member has a polygonal groove on an internal peripheral surface thereof for receiving the nut.

9 Claims, 2 Drawing Sheets

FISHING REEL HAVING NUT LOCK FOR PREVENTING LOOSENESS OF NUT

BACKGROUND OF THE INVENTION

1. Field of the Invention

The present invention relates to a fishing reel, and more particularly to an improvement of a coupling structure for coupling a driving shaft with a handle in a fishing reel.

2. Description of the Prior Art

In general, a fishing reel, particularly a bait casting reel, has a handle coupled with and fixedly mounted on one end portion of the driving shaft by a nut, which includes a looseness prevention member for preventing looseness of a nut fastened at one end portion of the driving shaft. As examples, Japanese Unexamined Utility Model Publication Nos. Sho 55-108873 and Hei 3-74266 disclose looseness prevention members mounted and fixed on the respective handles in the form of protrusions protruded from the respective upper portions thereof the handles.

Since the looseness prevention members disclosed in the above publications are all constructed to be protruded from the respective upper portions of the handles, a problem has been raised against a possible wound of the user's fingers due to an inadvertent contact with the looseness prevention members in the course of adjusting the fishing reel with the handle. Moreover, slime such as fish, bait, dust, etc, is apt to adhere to the looseness prevention members, and the fishing reel might also be entangled or coiled around the looseness prevention members.

To overcome such problem posed by the conventional reel, EP 0 654 216 B1 (Mimura) teaches a looseness prevention member, the external surface of which is formed of a smooth surface extending to the center from the peripheral rim. This prior art was referred to in the present application.

An embodiment of the above-referenced European patent is illustrated in FIG. 1. Referring to FIG. 1, the looseness prevention member is coupled with a nut 40 for preventing looseness of the nut. The looseness prevention member comprises a cover 30 shaped in elliptical form so as to be inserted into a recess 12, which is shaped in the corresponding elliptical form at the center of an upper portion of a handle 10. The cover 30 has a recess 36 on the backside thereof for preventing looseness of the nut by being aligned on the clamped nut. The looseness prevention member can be fixed onto the handle by being coupled with a screw 42 in a hole 18 of the handle 10.

The looseness prevention member also has a curved surface forming a shape of being protruded slightly from the peripheral rim to the center thereof. Accordingly, if the looseness prevention member is fixed onto the handle, a smooth surface may be formed to be enhanced to the external curved surface of the handle. The smooth surface formed in that manner to be enhanced to the curved surface of the handle serves to eliminate the possible caught-up of the bait, user's finger or fishing reel by the looseness prevention member.

In the looseness prevention member disclosed in the Mimura patent described above, a recess is formed internal surface thereof so as to prevent looseness of the nut for fixing the handle onto the driving shaft. In other words, the recess of the looseness prevention member is in complementary shape with the nut so that the recess can be in close contact with the external peripheral surface of the nut.

The nut used for fixing the handle onto the driving shaft is normally a hexagon nut. Allowable tolerance is unavoidable in the course of manufacturing the fittings such as handle, driving shaft, etc. Therefore, the position of a nut clamped through rotation, i.e., the degree of orientation of a nut, cannot always be consistent when mounting the handle onto the driving shaft by means of the nut. As a result, the nut cannot be aligned in a consistent direction inside of the recess of the handle. In other words, even if a nut is applied to the same reel, the nut will have different orientation degrees in each reel. To the contrary, the recess formed on internal surface of the looseness prevention member has a consistent degree of orientation due to its elliptical shape. Thus, a precise engagement of the clamped nut with the recess of the looseness prevention member can rarely be expected even after completion of the coupling. To align the clamping nut to be precisely engaged with the recess formed on the looseness prevention member, it is necessary to additionally rotate the nut to a certain extent.

Enlarging the recess formed on the internal surface of the looseness prevention member to be slightly greater than the nut for the purpose of overcoming the above drawback is apt to pose another problem of loosening the nut inside of the recess.

Moreover, since the looseness prevention member is in elliptical shape and fixed onto the handle by means of a single screw, the surface opposed to the one fixed by the screw tends to be slightly protruded from the curved surface of the handle. Furthermore, foreign material such as slime, etc, might be adhered around the periphery of the head portion of the screw exposed to the external surface of the looseness prevention member.

SUMMARY OF THE INVENTION

To resolve the above problems, an object of the present invention is to provide a fishing reel, in which the looseness prevention member can be aligned under the state of substantially fixing the nut for coupling the handle with the driving shaft.

Another object of the present invention is to provide a fishing reel capable of fixing the nut when coupling the handle with the driving shaft irrespective of the degree of orientation thereof the nut.

To achieve the above and other objects, the present invention provides a fishing reel with a handle fixing structure, under which a handle having a recess at the center is fixed onto a driving shaft. The handle fixing structure comprises a nut member which is received inside of a recess of the handle and couples the handle with the driving shaft, a nut lock member aligned inside of the recess for a close contact with the nut member so as to prevent looseness of the clamped nut member, and a cover for shielding the recess and limiting movement of the nut lock member through contact therewith during shielding.

Preferably, an internal screw section is formed on a part of a recess wall of the handle and the cover has a cylindrical portion including an external screw section threaded into the handle in cooperation with the internal screw section.

As an alternative embodiment, it is preferable that a groove is formed on a part of the recess wall of the handle, and that the cover has a cylindrical portion including a protrusion coupled with the handle by being snap-fitted into the groove.

The nut lock member is in cylindrical shape having an open one end, and a predetermined polygonal groove is formed on the internal surface thereof.

BRIEF DESCRIPTION OF THE DRAWINGS

The above object, other features and advantages of the present invention will become more apparent by describing the preferred embodiments thereof with reference to the accompanying drawings, in which.

DETAILED DESCRIPTION OF THE PREFERRED EMBODIMENT

The handle assembly structure, to which a nut lock member has been applied according to a preferred embodiment of the present invention will now be explained with reference to FIGS. 2 to 5.

Figure 1:
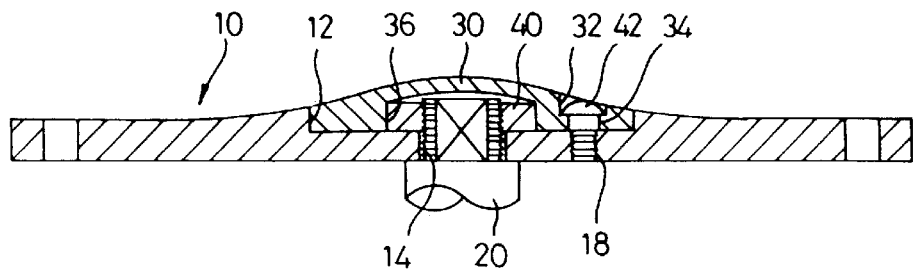
FIG. 1 is a cross-sectional view illustrating a handle of the conventional fishing reel comprising a looseness prevention member for preventing looseness of the handle.
Figure 2:
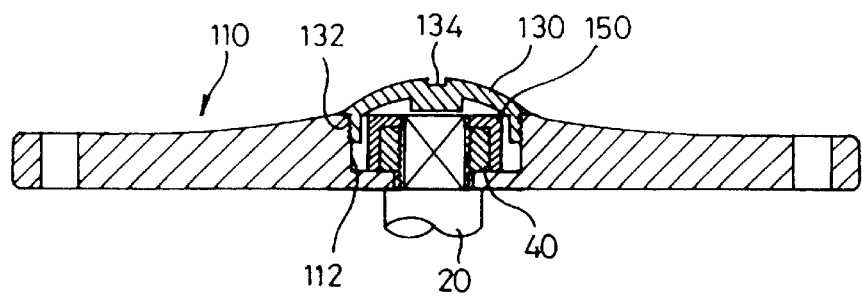
fig. 2 is a cross-sectional view illustrating a handle of the fishing reel according to a preferred embodiment of the present invention.

FIG. 2 is a cross-sectional view illustrating the status, in which the handle 110 is fixedly screw-coupled with one end portion of the driving shaft 20 by means of the nut 40. The nut 40 is aligned inside of the recess 12 at the center of the handle 110 under the state of being screw-coupled with one end portion of the driving shaft 20. The diameter of the handle-side end portion of the driving shaft 20 is smaller than that of the remaining portion, as depicted in FIG. 2. The diameter of the bore 14 of the handle 110 is greater than that of the handle-side end portion of the driving shaft 20 but is smaller than that of the remaining portion. Thus, the handle 110 can be fixed onto the larger diameter portion of the driving shaft 20 by means of the nut 40.

As an alternative, the driving shaft may have rotation preventing surfaces which are of different areas. To be specific, both side surfaces of the driving shaft may be cut off so as to be rotated according to the rotation of the handle inserted thereinto. The bore of the handle has a corresponding shape. If the surface area of the rotation preventing surface on the upper portion of the driving shaft is finished to be greater than that of the rotation preventing surface on the lower portion thereof, i.e., the cut-off upper portion of the driving shaft is greater than that of the other portion, a stepped portion is formed on the driving shaft. If the bore of the handle is finished to have a shape corresponding to that of the rotation preventing surface on the upper portion thereof, the handle can be inserted into the upper portion only of the driving shaft.

The nut lock member 150 is aligned to surround the nut 40 inside of the recess 120 of the handle 110. While in close contact with the nut 40, the nut lock member 150 is spaced from the recess 112 at some intervals. The cylindrical portion of the cover 130 is inserted between the nut lock member 150 and the recess 112 so as to contact the recess 112.

An external screw section is formed around the peripheral surface of the cylindrical portion of the cover 130 so as to be screw-coupled with an internal screw section. When the cover 130 is completely screw-coupled with the recess 112, at least a part of the internal surface thereof is in contact with the upper portion of the nut lock member 150. As a consequence, the nut lock member 150 becomes unable to freely rotate inside of the recess 112. A groove 134 is formed on an upper surface of the cover 130 for an easy screw-coupling of the cover 130 with the recess 112.

As a variable embodiment of the cover, a snap-fit coupling section may replace the screw section on the external peripheral surface of the cylindrical portion. A groove should be formed on the recess wall of the handle so as to receive a snap fit coupling section.

Figure 3:
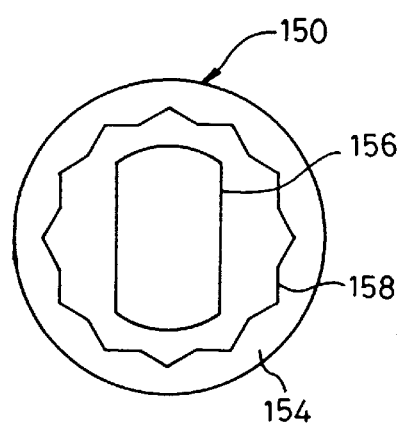
FIG. 3 is a bottom plan view of the nut lock member for preventing looseness of the hexagonal nut.
Figure 4:
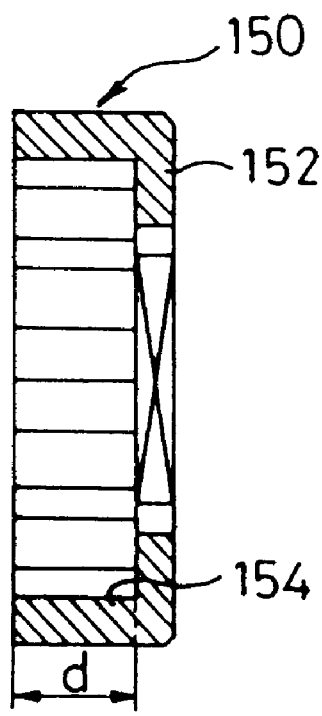
FIG. 4 is a cross-sectional view of FIG. 3.
Figure 5:
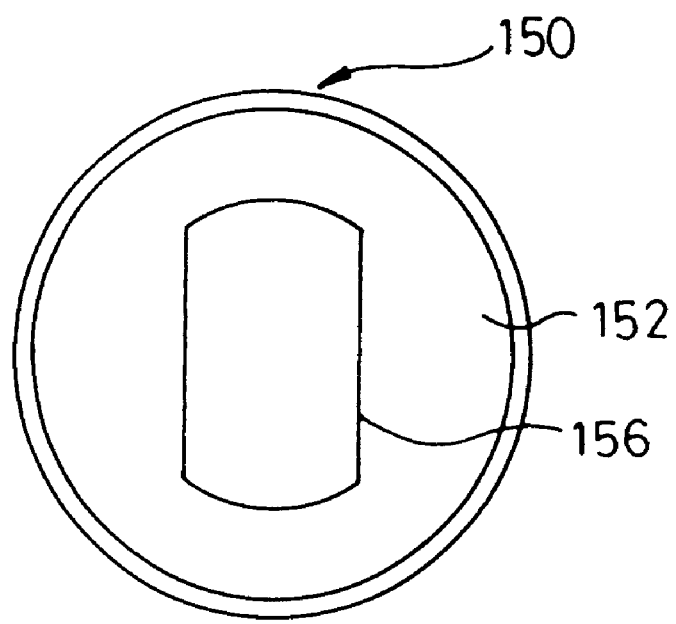
FIG. 5 is a top plan view of FIG. 3.

FIGS. 3 to 5 illustrate an embodiment of the nut lock member 150 according to the present invention. The nut lock member 150 is in cylindrical shape having an open end. The bore 156 is formed at the other end of the nut lock member 150 in a shape corresponding to that of the rotation preventing surface of the driving shaft 20. Therefore, the driving shaft is prevented from being rotated in left or right direction under the state of being inserted into the nut lock member 150. Since the net lock member 150 can be fixed by the cover coupled inside of the recess, the bore 156 of the nut lock member may be formed in a circular form.

Referring to FIG. 3 illustrating a bottom plan view of the nut lock member 150, a dodecagonal groove 158 is formed on the internal peripheral surface of the nut lock member 150. The depth of the groove 158 is preferably almost the same as the height of the nut.

When inserted, the open end of the nut lock member 150 orients the lower direction so that the nut is inserted inside of the nut lock member. The nut then can be precisely engaged with the internal peripheral surface of the nut lock member with only a slight rotation. In other words, the dodecagonal groove formed on the internal peripheral surface of the nut lock member enables the ordinary hexagonal nut to be precisely engaged with the internal peripheral surface with a rotation of 30° only at the maximum.

Specifically, when the nut lock member 150 is aligned inside of the recess 112 of the nut lock member 150, the shape of the bore 156 should conform to that of the end portion of the driving shaft 20. Therefore, the same degree of orientation is maintained when the nut lock member is mounted. Since the nut 40 rotates until the handle is firmly coupled with the driving shaft, however, the degree of orientation of the hexagonal nut may be variable in each product. If the degree of orientation of the nut 40 does not conform to that of the nut lock member 150, the nut can be precisely engaged inside of the nut lock member 150 with a rotation of 30° only at the maximum. As far as the nut is sufficiently clamped, the rotation of the nut within the scope of 30° rarely affects the degree of coupling between the handle and the driving shaft.

As described above, however, when the bore of the nut lock member 150 has been formed in a circular shape, the nut lock member can be easily inserted according to the nut but irrespective of the degree of orientation of the eventually assembled nut. In that case, the looseness of the nut can be prevented by simply forming a hexagonal groove on the internal peripheral surface of the nut lock member.

The construction described above serves to prevent a loose coupled state of the nut when coupling the handle with the driving shaft. Particularly because of the dodecagonal groove formed inside of the nut lock member, the nut can be fixedly inserted inside of the looseness prevention member with only a slight movement under the eventually assembled state.

While the present invention has been described and illustrated herein with reference to the preferred embodiments thereof, it will be understood by those skilled in the art that various changes in form and details may be made therein without departing from the spirit and scope of the present invention.

What is claimed is:
1. A fishing reel with a handle fixing structure, comprising:

a handle having a recess at a center thereof, said handle being fixed onto a driving shaft, said handle fixing structure being received inside of said recess;

a nut member for coupling said handle with said driving shaft;

a nut lock member aligned inside of said recess by being in close contact with said nut member for preventing looseness of said nut member, and a cover for shielding said recess and limiting movement of said nut lock member through contact therewith during shielding, wherein said cover comprises a cylindrical portion in which an external screw section is formed so as to be coupled with said recess including an internal screw section on a part of a wall thereof, and said cylindrical portion is screw-coupled with said recess by means of said screw sections during shielding the recess with the cover.

2. The fishing reel of claim 1, wherein said nut lock member is in cylindrical shape having an open end.

3. The fishing reel of claim 1, wherein said nut lock member has a polygonal groove on an internal peripheral surface thereof.

4. The fishing reel of claim 3, wherein the depth of said polygonal groove is the same as the height of said nut.

5. The fishing reel of claim 3, wherein the polygonal groove is a dodecagonal groove.

6. The fishing reel of claim 3, wherein the polygonal groove is a hexagonal groove.

7. The fishing reel of claim 3, wherein said nut lock member comprises a rotation preventing bore for receiving said driving shaft at one closed end thereof.

8. The fishing reel of claim 1, wherein said cover has a groove on an upper portion thereof.

9. A fishing reel with a handle fixing structure, comprising:

a handle having a recess at a center thereof, said handle being fixed onto a driving shaft, said handle fixing structure being received inside said recess;

a nut member for coupling said handle with said driving shaft;

a nut lock member aligned inside of said recess by being in close contact with said nut member for preventing looseness of said nut member; and a cover for shielding said recess and limiting movement of said nut lock member through contact therewith during shielding, wherein said cover comprises a cylindrical portion, in which a protrusion is formed so as to be coupled with said recess including a groove corresponding to said protrusion on a part of a wall thereof, and said protrusion of said cylindrical portion is snap-fitted into said groove of said recess during shielding said recess with the cover.

* * * * *